United States Patent

Friese et al.

[11] 4,309,176
[45] Jan. 5, 1982

[54] PROCESS FOR THE OILING AND IMPREGNATION OF LEATHER AND PELTS

[75] Inventors: Hans-Herbert Friese, Monheim; Jürgen Plapper, Hilden; Uwe Ploog, Haan; Emil Ruscheinsky, Leverkusen, all of Fed. Rep. of Germany

[73] Assignee: Henkel Kommanditgesellschaft auf Aktien, Düsseldorf-Holthausen, Fed. Rep. of Germany

[21] Appl. No.: 185,605

[22] Filed: Sep. 10, 1980

[30] Foreign Application Priority Data

Oct. 1, 1979 [DE] Fed. Rep. of Germany ....... 2939741

[51] Int. Cl.³ .............................................. C14C 9/02
[52] U.S. Cl. ..................................... 8/94.23; 8/94.22; 252/8.57
[58] Field of Search ............................ 8/94.22, 94.23; 252/8.57

[56] References Cited

U.S. PATENT DOCUMENTS

| | | | |
|---|---|---|---|
| 2,555,684 | 6/1951 | Castro et al. | 252/8.57 |
| 2,974,000 | 3/1961 | Retzsch et al. | 8/94.23 |
| 3,402,071 | 9/1968 | Heyden et al. | 252/8.57 |
| 3,957,426 | 5/1976 | Dieckelmann et al. | 8/94.22 |
| 3,988,247 | 10/1976 | Dieckelmann et al. | 8/94.22 |

FOREIGN PATENT DOCUMENTS 290914 3/1971 U.S.S.R. ................................ 8/94.23

*Primary Examiner*—Maria Parrish Tungol
*Attorney, Agent, or Firm*—Hammond & Littell, Weissenberger and Muserlian

[57] ABSTRACT

This invention is directed to an improved process of oiling and impregnating leather or pelts in which the leather or pelts are contacted with one or more oiling substances in an aqueous liquor, wherein the improvement comprises using an alkylolamide ether sulfate or phosphate of fatty acids of the formula

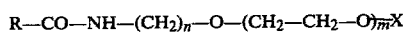

wherein
R represents an aliphatic radical of from about 13 to 19 carbon atoms;
n is a number of from 2 to 4;
m is a number of from 1 to 4;
X is $-SO_3Y$ or $-PO(OY)_2$; and
Y is a sodium, potassium, or ammonium anion as an oiling substance in the liquor bath.

6 Claims, No Drawings

PROCESS FOR THE OILING AND IMPREGNATION OF LEATHER AND PELTS

FIELD OF THE INVENTION

This invention is directed to a process for the oiling and impregnation of leather and pelts. More specifically, this invention is directed to a process for oiling and impregnation of leather and pelts wherein fatty acid alkylolamide ether sulfates or phosphates are used in the liquor bath.

BACKGROUND OF THE INVENTION

Emulsifying agents play an important role in the preparation and treatment of leather and pelts. On the one hand, they are used to emulsify neutral oiling substances for the fat-liquoring, and, on the other hand, they themselves have a considerable influence on the oiling effect (R. Heyden, *Leder*-und Häutemarkt, 1962).

The use of anionic emulsifying agents is most widespread since these are largely bound by the leather—especially in the acid range—and cannot be extracted with weakly polar solvents.

Despite a certain binding capacity to the leather fiber, emulsifying agents with a sulfate group in the hydrophilic part of the molecule, for example, sulfates of fatty alcohols, impart an increased affinity for water to leather. This is particularly undesirable in upper leather and leather for garments, as this lowers their use value. In addition, such sulfates exhibit an inadequate electrolyte resistance so that they cannot be used in chrome tanning.

OBJECTS OF THE INVENTION

It is an object of the invention to provide a process for the oiling and impregnation of leather and pelts.

It is also an object of the invention to provide a process for the oiling and impregnation of leater and pelts wherein fatty acid alkylolamide ester sulfates or phosphates are used in the liquor baths.

These and other objects of the invention will become more apparent in the discussion below.

DESCRIPTION OF THE INVENTION

It has now been found that certain compounds, when used alone or in combination with conventional oiling agents in the liquoring solution, considerably improve, in a surprising manner, the behavior with respect to water of leather and pelts treated with these compounds. These compounds are alkylolamide ether sulfates or phosphates of fatty acids of the formula $$R-CO-NH-(CH_2)_n-O-(CH_2-CH_2-O)_{\overline{m}}X \quad (I)$$

wherein

R is an aliphatic radical of from about 13 to 19 carbon atoms;

n is a number of from 2 to 4;

m is a number of from 1 to 4;

X is $-SO_3Y$ or $-PO(OY)_2$; and

Y is a sodium, potassium, or ammonium anion.

Particularly preferred are those compounds of Formula I wherein R—CO is an acyl of a fatty acid of from 16 to 18 carbon atoms, n is 2, and m is a number of from 2 to 3.

The preparation of the alkylolamide ether sulfates of fatty acids can be carried out by generally known processes of amidation, ethoxylation, sulfation, and neutralization (Reng, Quack, *Seifen, Ole, Fette, Wachse*, 1976, p. 307), starting with fatty acids or mixtures of fatty acids with chain lengths of from 14 to 20 carbon atoms, preferably from 16 to 18 carbon atoms. An especially suitable fatty acid mixture is hardened $C_{16}$-$C_{18}$-stearic acid.

The corresponding phosphates are suitably prepared by the reaction of alkylolamide ether of fatty acids with $P_2O_5$.

The alkylolamide ether sulfates or phosphates of fatty acids can be used alone in fat-liquoring. The amount to be used is from about 0.1 to 10 percent by weight of active substance, based on the shaved weight.

The alkylolamide ether sulfates of fatty acids can be used in chrome tanning because of their resistance to electrolytes. The amount to be used in this instance is from about 0 to 4 percent by weight of active substance, based on the beamhouse weight.

The leather obtained is very soft and has an improved behavior with regard to water, i.e., its affinity for water is reduced. The leather has a very good color quality.

The alkylolamide ether sulfates or phosphates of fatty acids are preferably used in combination with conventional oiling agents, for example, neutral oils of natural or synthetic basis, liquid paraffin, waxes, or sulfation products of fatty acid esters, as well as their chlorination products. The softness, behavior with respect to water, and uniformity of color are improved in this case as well.

The following examples are intended to illustrate the invention and are not to be construed as limiting the invention thereto.

EXAMPLES

Example I

Cowhide Upper Leather

Pelts that were limed, delimed, bated, and pickled in known manner—but without any addition of emulsifying agents—were chrome tanned and then re-tanned with 4 percent of a basic chromium salt 1 percent of a synthetic tanning agent based on a phenol condensation product 1 percent of a resin tanning agent based on polyacrylate.

The dyeing was carried out in a well-known manner with 1 percent of an acid dye.

The oiling was performed in a fresh liquor solution by the following method:

The dyed skins were left running in the vat for 45 minutes with 50 percent water at 60° C.

6 percent $C_{16}$-$C_{18}$-fatty acid-ethanolamide-2-EO-sulfate-Na as oiling substance (fat-liquoring A).

Subsequently 1 percent formic acid was added, and the bath was operated for an additional 15 minutes. (The percentages are based on the wet-blue weight.)

As a comparison, the procedure was repeated using 6 percent of $C_{16}$-$C_{18}$-fatty alcohol-2-EO-sulfate as oiling substance (fat-liquoring B).

In both cases, the leathers were finished in usual manner. The soft leathers obtained were tested for water penetration and water absorption, and the results were as follows:

TABLE 1

|  | Fat-liquoring A | Fat-liquoring B |
| --- | --- | --- |
| Water penetration penetrometer, 10% penetration | 40 min. | 2 min. |
| Water absorption dynamically, after 3 hours | 24% | 93% |
| statically, after 24 hours | 72% | 105% |

As can be seen from the table, the leathers treated in accordance with the invention, i.e., with fat-liquoring A, exhibited slower water penetration and a lower water absorption. A similar result was obtained when $C_{16}$–$C_{18}$-fatty acid-ethanolamide-2-EO-phosphate-Na was used as oiling substance.

Example II

Impregnated Cowhide Upper Leather

Pelts that were limed, delimed, bated, and pickled in known manner—but without any addition of emulsifying agents—were chrome tanned and then re-tanned with
- 4 percent of a basic chromium salt
- 1 percent of a sodium salt of a dicarboxylic acid, for example, adipic acid
- 1 percent glutaraldehyde.

Dyeing was carried out in a well-known manner with 1 percent of an acid dye.

The fat-liquoring was carried out in a fresh solution, by the following method:

The dyed skins were left running in the vat for 30 minutes with
- 50 percent water at 60° C.
- 7 percent sulfoxidized paraffin sludge
- 0.4 percent $C_{16}$–$C_{18}$-fatty acid-ethanolamide-2-EO-sulfate-Na.

Subsequently
- 0.5 percent formic acid
- 2 percent basic chromium salt was added, the bath was operated for 60 minutes, and then for an additional 15 minutes, and the skins were rinsed well. (The percentages are based on the wet-blue weight.)

After the usual finishing, leathers were obtained that were very soft to the touch and had an excellent behavior with respect to water. The leathers were determined to have the following properties:

TABLE 2

| Water penetration penetrometer, 5% penetration | 7 hours |
| --- | --- |
| Water absorption dynamically, 3 hours | 14% |

Example III

Sueded Split Cowhide for Upper Leather

Pelts that were limed, delimed, bated, and pickled in known manner—but without any addition of emulsifying agents—were chrome tanned. After splitting, re-tanning was carried out in known manner with 5 percent of a synthetic tanning agent based on a phenol condensation product. Fat-liquoring was carried out in a fresh solution, by the following method:

The re-tanned skins were left running in the vat for 30 minutes with
- 50 percent water at 60° C.
- 6 percent oiling substance consisting of 1 part $C_{18}$-fatty acid-ethanolamide-3-EO-sulfate-NA, and 2 parts soft paraffin.

Subsequently
- 0.5 percent formic acid was added, and the bath was operated for 15 minutes. (The percentages are based on the split weight.)

The leathers obtained were dried, buffed, and dyed in the usual manner. The final products were very soft leathers which exhibited good behavior with respect to water. As set forth in the following table, water penetration was delayed and the water absorption was reduced:

TABLE 3

| Water penetration penetrometer, 10% penetration | 137 min. |
| --- | --- |
| Water absorption dynamically, after 3 hours | 23% |

Similar results were obtained when $C_{18}$-fatty acid-ethanolamide-3-EO-phosphate-Na was used as liquoring substance.

Example IV

Upholstery Leather

Pelts that were limed, delimed, and bated in known manner—but without any addition of emulsifying agents—were pickled, pre-oiled, and chrome tanned by the following method:

The pelts were left running in the vat for 10 minutes with
- 100 percent water at 22° C.
- 7 percent common salt, i.e., sodium chloride.

Then
- 0.7 percent sulfuric acid (96% solution)
- 0.7 percent formic acid were added, and the bath was operated for an additional 2 hours (pH 3.5 through cross-section of the skins). Subsequently, the skins were left running for 30 minutes with
- 2.0 percent oiling substance consisting of 1 part $C_{16}$–$C_{18}$-fatty acid-ethanolamide-2-EO-sulfate-Na, and 9 parts of a sulfated mixture of lanolin and train oil (1:1)

and then
- 8 percent of a basic chrome tanning salt, for example, Chromosal B ® from Bayer AG
- 0.6 percent magnesium oxide were added and the bath was operated for 5 hours. (All percentages are based on the beamhouse weight.)

After the usual finishing, leathers were obtained that were as soft as cloth and had a high tear-resistance but did not exhibit the affinity for water that is due to the conventional oiling during tanning. A subsequent impregnation, for example, with chrome stearate, is possible if desired.

Example V

Chamois Leather

Sheepskins were soaked, washed, and pickled by the usual manner. The subsequent processing was as follows:

The skins were run in a bath (skin:water ratio of 1:20) containing 40 gm/l of salt for five minutes, and then the bath was operated with 7 gm/l of basic chrome tanning salt
for 1 hour. Next,
  2.5 gm/l of oiling substance consisting of 1 part $C_{16}$-$C_{18}$-fatty acid-ethanolamide-2-EO-sulfate-Na,
  1 part of a sulfited mixture of methyl ester of fatty acids and train oil (1:1), and 1 part of a mixture of lanolin and sulfited train oil (1:4)
were added, and the bath was operated for an hour. After addition of
  7 gm/l of a basic chrome tanning salt
the bath was operated for an additional 10 hours and then adjusted to a pH of 4.0 with 1.5 gm/l of sodium bicarbonate. After the usual finishing, very soft chamois leather with good elasticity and softness were obtained. The affinity for water was lower than in conventional chamois leather.

Example VI

Preparation of Ethanolamide Ether Sulfates of Fatty Acids

An amount of 308.2 gm (1 mol) of monoethanolamide-2-EO-of coconut fatty acids (OH number: 182) was heated to 40°–45° C. in a three-neck flask equipped with agitator, thermometer, tube to pass through nitrogen, and dropping funnel, and reacted with 116.5 gm (1 mol) of chlorosulfonic acid at that temperature. The reaction time was approximately 45 minutes. The mixture was allowed to react for another 20 minutes (approximately), and the sulfuric acid semi-ester was poured, at approximately 45° C., in small portions and with stirring into a solution of 40 gm of sodium hydroxide in 600 ml of distilled water.

A copiously foaming, viscous solution of the desired amide ether sulfate was obtained with a yield of 1,028 gm.

NaSO$_3$-H (acc. Epton): 6.38%
Active substance (MW 410.2): 25.7%

Example VII

Preparation of Ethanolamide Ether Sulfates of Fatty Acids

Four hundred and forty-four grams (1 mol) of monoethanolamide-4-EO of coconut fatty acids was sulfated analogously to Example VI with 116.2 gm (1 mol) of chlorosulfonic acid and neutralized with 72 gm of sodium hydroxide in 805 gm of water.

Yield: 1,367 gm of a yellow, viscous liquid.
NaSO$_3$-H (acc. Epton): 4.95%
Active substance (MW 546): 26.5%
Alcohol extract: 40.0%
Water content: 55.0%

Example VIII

Preparation of Ethanolamide Ether Phosphates of Fatty Acids

An amount of 308.2 gm (1 mol) of monoethanolamide-2-EO of coconut fatty acids (OH number: 182) was heated to approximately 65° C. in a three-neck flask with agitator, thermometer, and tube to pass in nitrogen, and reacted with 71 gm of phosphorus pentoxide in small portions at that temperature. Then the mixture was heated to 85°–90° C. and kept at that temperature for 3 hours. Then, 40 gm of sodium hydroxide was dissolved in 728 gm of water and the acid ester was slowly added.

Yield: 1,180 gm of a soft, yellow paste.
Alcohol extract: 34.6%
Water content: 63.1%

Example IX

Preparation of Ethanolamide Ether Phosphates of Fatty Acids

Three hundred seventy-four grams (1 mol) of monoethanolamide-2-EO of tallow fatty acids (OH number: 150) were reacted analogously to Example VIII with 71 gm of phosphorus pentoxide and neutralized with 40 gm sodium hydroxide in 850 gm water.

Yield: 1,337 gm of a firm, yellow paste.
Alcohol extract: 30.6%
Insoluble in alcohol: 5.4%
Water: 61.6%

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process of oiling and impregnating leather or pelts wherein the leather or pelts are contacted with one or more oiling substances in an aqueous liquor,
    the improvement comprises using an alkylolamide ether sulfate or phosphate of fatty acids of the formula $$R-CO-NH-(CH_2)_n-O-(CH_2-CH_2-O)_{\overline{m}}X$$

wherein
R represents an aliphatic radical of from about 13 to 19 carbon atoms;
n is a number of from 2 to 4;
m is a number of from 1 to 4;
X is —SO$_3$Y or —PO(OY)$_2$; and
Y is a sodium, potassium, or ammonium anion
as an oiling substance in the liquor bath.

2. A process of claim 1 wherein
R—CO represents an acyl of a fatty acid having from 16 to 18 carbon atoms;
n is 2; and
m is 2 or 3.

3. The process of claim 1 wherein the fatty acid alkylolamide ether sulfate or phosphate is used in an amount of from 0.1 to 10 percent by weight, based on the shaved weight of the leather or pelt.

4. The process of claim 1 wherein the fatty acid alkylolamide ether sulfate or phosphate is used in conjunction with conventional fat-liquoring substance.

5. The process of claim 4 wherein the conventional fat-liquoring substance is selected from the group consisting of neutral oils of a natural or synthetic base, paraffin oils, waxes, sulfation productions of fatty acid esters or chlorination products thereof, or mixtures thereof.

6. The process of claim 1, wherein the fatty acid alkylolamide ether sulfate or phosphate is used in conjunction with conventional fat-liquoring substance selected from the group consisting of neutral oils of a natural or synthetic base, paraffin oils, waxes, sulfation productions of fatty acid esters or chlorination products thereof, or mixtures thereof.

* * * * *

UNITED STATES PATENT AND TRADEMARK OFFICE
CERTIFICATE OF CORRECTION

PATENT NO. : 4,309,176
DATED : January 5, 1982
INVENTOR(S) : HANS-HERBERT FRIESE et al.

It is certified that error appears in the above-identified patent and that said Letters Patent is hereby corrected as shown below:

Column 5, line 43, "was" should read -- were --.

Claim 5, line 4, and Claim 6, line 6, "productions" should read -- products --.

Signed and Sealed this

Third Day of May 1983

[SEAL]

Attest:

*Attesting Officer*

GERALD J. MOSSINGHOFF

*Commissioner of Patents and Trademarks*